April 23, 1935.  R. P. LANSING  1,998,782
VALVE GEAR
Filed June 1, 1931  2 Sheets-Sheet 1

INVENTOR
Raymond P. Lansing
BY
ATTORNEY

April 23, 1935. R. P. LANSING 1,998,782
VALVE GEAR
Filed June 1, 1931 2 Sheets-Sheet 2
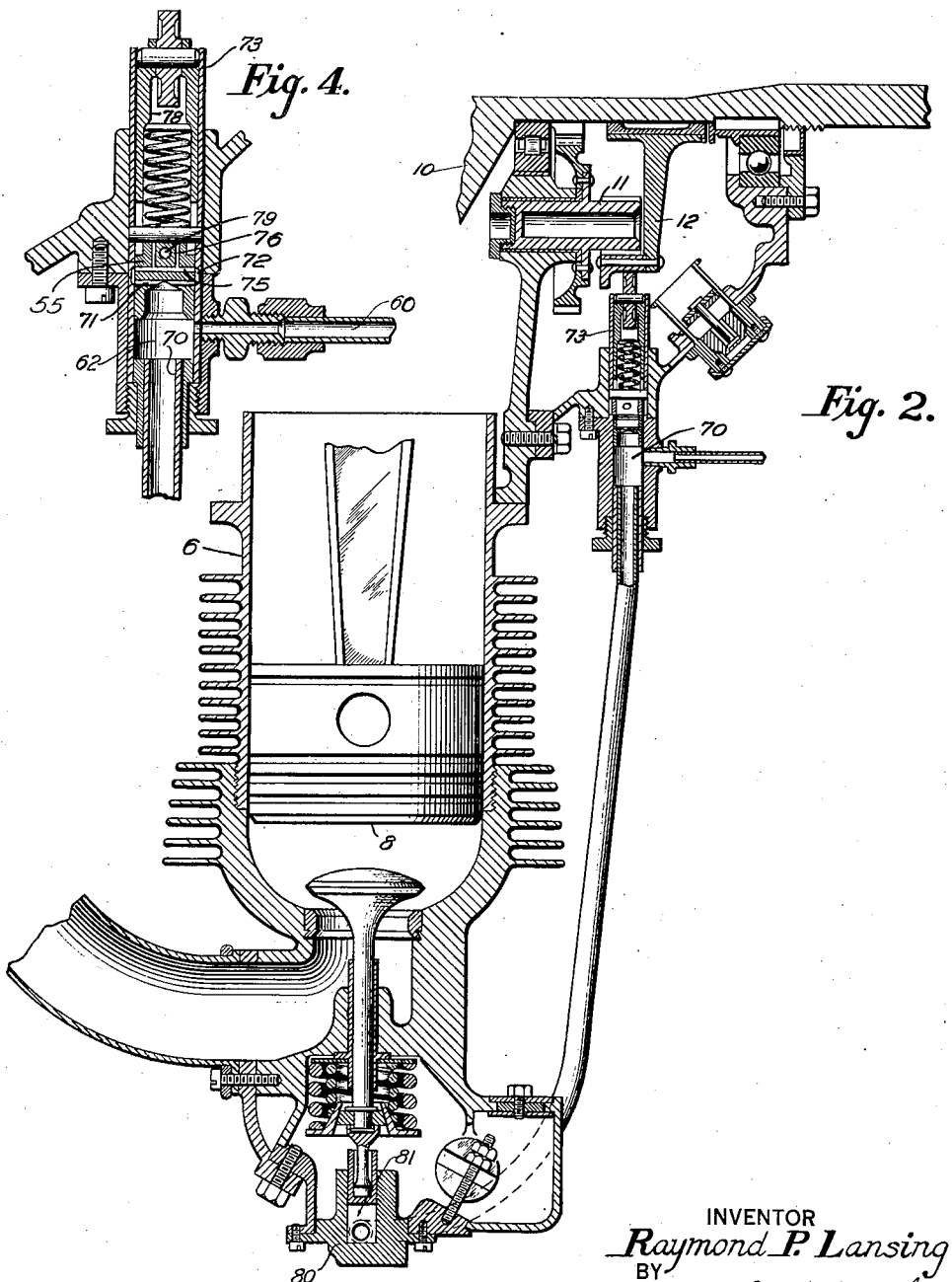
INVENTOR
Raymond P. Lansing
BY
F. B. Smith
ATTORNEY Patented Apr. 23, 1935

1,998,782

UNITED STATES PATENT OFFICE 1,998,782

VALVE GEAR

Raymond P. Lansing, Montclair, N. J., assignor to Bendix Research Corporation, East Orange, N. J., a corporation of Indiana Application June 1, 1931, Serial No. 541,459

4 Claims. (Cl. 123—90)

This invention relates to hydraulic valve gears or similar pressure-operated devices of the type wherein a closed column of oil is utilized as the motion transmitting means between an actuating member and an actuated member, such as between a valve tappet and a cylinder valve of an engine.

An object of the invention is to provide a valve operating mechanism of the foregoing character which is adaptable for use with practically any known type of multi-cylinder engine, including engines in which the cylinders are disposed at various angles and degrees of inclination or inversion, such as for example, radial engines of the types commonly used on aircraft.

Another object of the invention is to provide in a valve gear of the foregoing character, novel means for automatically relieving the mechanism of air or other objectionable fluid which may collect in the various units of the system and which might otherwise interfere with the proper or efficient functioning of the mechanism.

Another object of the invention is to provide in a mechanism of the foregoing character, novel means for utilizing the fluid pumping element of an engine as the medium for controlling operation of the cylinder valves.

Another object of the invention is to provide an engine valve gear of novel construction insuring efficient operation with a minimum number of parts, and affording compactness of arrangement and economy in space occupied and power consumed.

Further objects and advantages to be derived from the use of the construction and principles of operation embodied in the invention will become apparent as said invention is further understood by reference to the following description which explains, in conjunction with the accompanying drawings, the preferred embodiment thereof. It is to be understood, however, that the drawings are for the purpose of illustration only, and are not designed as a definition of the limits of the invention, reference being had to the appended claims for this purpose.

In the drawings,

Figs. 1 and 2 are longitudinal sectional views showing the invention applied to an internal combustion engine of the type employing upright and inverted cylinders, Fig. 1 showing the application of the invention to a cylinder of the former type and Fig. 2 showing its application to an inverted cylinder of the same engine;

Fig. 3 is a longitudinal sectional view, on a larger scale, of certain parts shown in Fig. 1; and, Fig. 4 is a longitudinal sectional view, on a larger scale, of certain parts shown in Fig. 2;

Figures 1, 3:
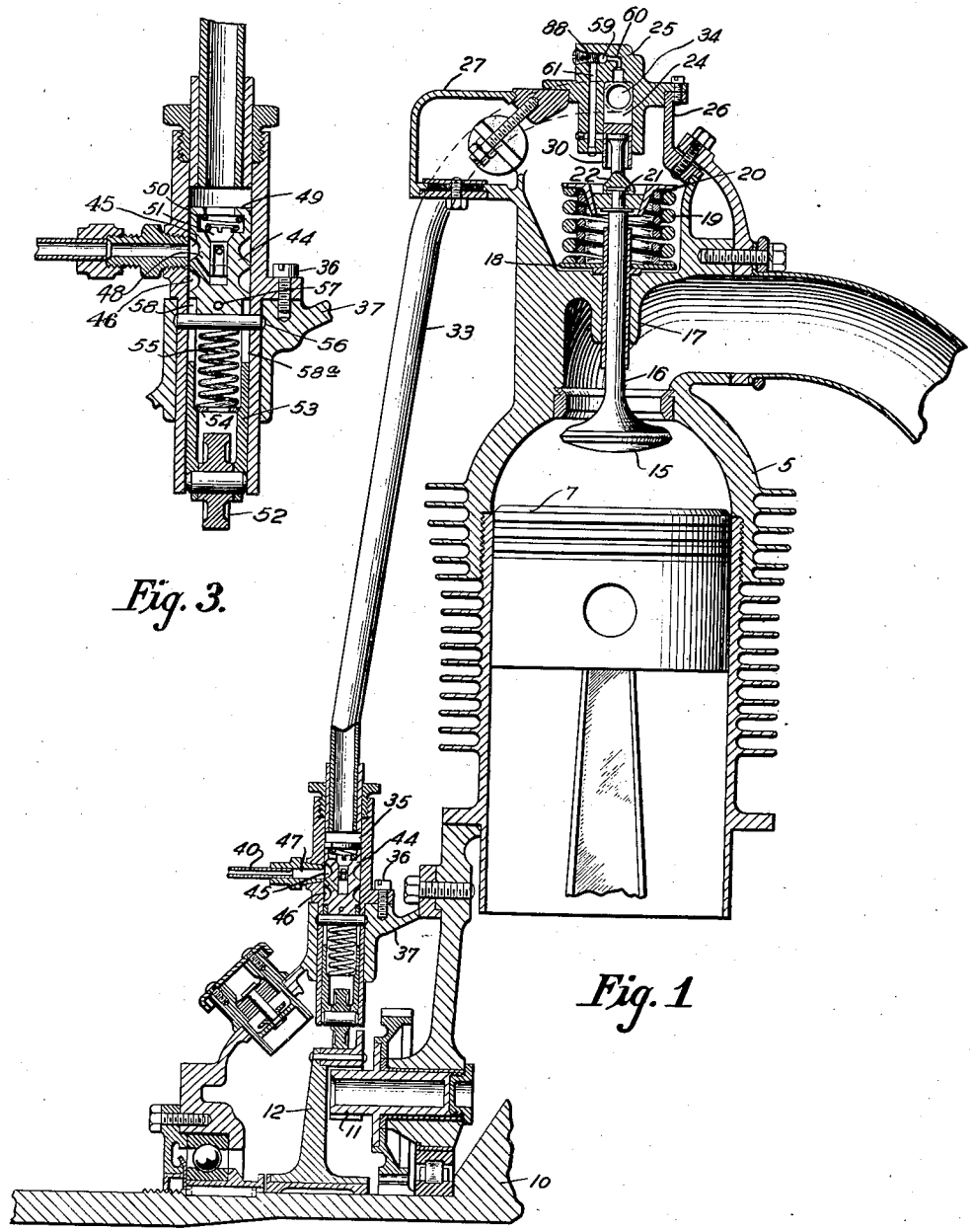

Referring to the drawings, the invention is shown embodied in a valve gear applied to an engine having oppositely disposed cylinders 5 and 6, with pistons 7 and 8, respectively, both pistons being drivably connected in the usual manner to the engine crankshaft, of which the shaft shown at 10 in Figs. 1 and 2 may be part, or another shaft geared thereto; the shaft 10 having geared thereto planetary pinions 11 meshing with an internally toothed rotatable cam track 12 for a purpose to appear more fully hereinafter.

As shown, each of the cylinders 5 and 6 is preferably provided with a pair of fuel controlling valves, only one of which is shown for each of the cylinders, it being understood that by duplication of the parts the invention may be applied to each valve of each cylinder. The valve indicated by reference character 15 in Fig. 1 is shown as of the usual poppet type having a stem 16 the upper end of which is slidable in the cylinder boss 17, on the upper plane surface of which is disposed a disc 18 acting as a seat for springs 19, the opposite ends of which press upon the under surface of the flanged retainer 20, to the central core of which is secured the reduced end 21 of the valve stem 16, end 21 being in turn operatively secured to a connecting pin constituting part of the novel hydraulic actuating means to be described.

The novel means for producing periodic actuation of the valve 15 by hydraulic pressure preferably includes an open ended inverted cylinder 24 formed in any suitable manner above the upper end of the valve stem, as for example, by providing a suitable casting 25 secured to the cylinder 5 by suitable means including the flanged connecting bracket 26 and the casing member 27. The cylinder 24 is formed by boring or otherwise suitably chambering the said casting 25 so as to adapt it to receive the piston member 30 which is in turn hollowed to receive the upper end of the connecting pin 22. The cylinder 24 is preferably connected to a source of fluid pressure, such as the engine oil pump, by a suitable conduit 33 connected by suitable fitting with the opening 34 into the cylinder 24, the supply end of the conduit 33 being adapted to receive the pressure fluid from a suitable chamber in cylinder 35, the latter being rigidly supported by suitable means 36 on a bracket 37 constituting part of the frame work of the engine. The cylinder 35 is further adapted to be supplied with pressure fluid from the engine oil pump or other source from which the supply tube 40 leads, and is also adapted to contain the mechanism for controlling and regulating the pressure applicable, through the conduit 33, upon the valve 15, such mechanism constituting one of the novel features of the invention now to be described.

The novel pressure controlling and impulse producing means comprises an elongated piston member or plunger 44 reciprocable in the cylinder 35 and having a pair of circumferential grooves 45 and 46, the former constituting a fluid port adapted to register intermittently with the passage 47 in which the tube 40 terminates, the piston being further provided with a recess 49 in the upper surface thereof in which is mounted a spring 50 adapted to press against the check valve 51 of the piston, and prevent said valve from entirely leaving plunger 44, the valve 51 being slidable in a central bore communicating with groove 45 by means of a port 48. Upward motion is imparted to the piston periodically by the cam follower 52 by means of a suitable operative connection therebetween which, in the form shown, comprises a sleeve 53 movable with the follower 52, the said sleeve having a shoulder 54 on which is received a washer acting as a seat for the coil spring 55, the upper end of which engages the pin 56 pressed in housing 37, said spring helping to return plunger 44 to its lowest or non-operative position. For this purpose the plunger 44 is provided with a transversely disposed pin 57 engaging the upper portion of sleeve 53 to cause the two elements to move in unison, the sleeve 53 having suitable longitudinal slots 58 and 58a to permit its reciprocation to the desired extent.

The novel means for automatically eliminating air or other extraneous fluid trapped in the system includes a relief valve mechanism for each unit, the relief valve for the cylinder 24 being indicated at 59 in Fig. 1. As shown, the valve 59 is disposed at the upper end of a passage 60 having communication with the atmosphere (by means of the passage 61) only when the piston 30 is at or near the uppermost position of its stroke.

Having described the parts entering into the preferred embodiment of the invention as applied to the valves of cylinders whose heads are upwardly directed, the operation thereof will be seen to be as follows:

On each revolution of the crankshaft, the valve operating roller 52 of each cylinder will in the proper sequence cause a lifting of its associated piston 44, thereby exerting pressure through the oil conduit 33, which pressure is operable on piston 30, as shown in Fig. 1, to cause downward movement of the pin 22, and hence opening of the valve 15 against the force of the springs 19. Just after the inauguration of this downward movement of the piston 30, the port 61 is closed, thereby rendering escape of the oil under pressure impossible.

After the cam surface of track 12 is withdrawn from the roller 52, the spring 55 is effective to return the plunger 44 to its lowermost position, thereby relieving the pressure in cylinder 24, and at the same time permitting the oil pump to inject a new charge of oil into the cylinder 35 by way of the passages 47 and groove 45, if any oil has escaped from system. Also near the end of the return movement of the plunger 30, port 61 is again uncovered to allow the escape of any air trapped in this portion of the system, such air being forced past the ball check valve 59 whenever the pressure thereof exceeds the strength of spring 88.

The construction of the pressure applying mechanism for cylinders located below the crankshaft may be the same as that above described, except for a corresponding inversion or inclination of the parts, and except that, as indicated in Figs. 2 and 4, pressure fluid is supplied from the engine oil pump or other source through conduits 60 leading to chamber 62 formed in the respective cylinders 73 below the pistons 55 which are connected to the cam operated sleeves 78 by cross-pins 79 corresponding to the pins 57 which connect the upper pistons 44 with corresponding sleeves 53. The chamber 62 is provided with conduits 70 leading to cylinders 80 and chambers 81, corresponding in function and operation to the plungers 30 of the upper cylinders. With respect to the relief means employed for the cylinders below the center line of the engine, however, the operation is somewhat different, the escape of air in each unit taking place at or near the end of the upward movement of the corresponding piston 55, such escape being by way of chamber 62, transverse passage 71, cylinder port 72, upper transverse passage 75, longitudinal passages 76, and out to the crankcase by way of the upper end of sleeve 78.

There is thus disclosed a novel valve actuating mechanism of the hydraulic type in combination with novel means for maintaining proper pressure in the oil column, replenishing any losses in the oil supply and insuring against the accumulation of air in the operating chambers. While the structure herein employed is of considerable practical merit and provides efficient operation with a minimum plunger movement and an absence of noise-producing contacts and chattering of parts, it is to be understood that the invention is not limited to the precise construction and interrelation of parts herein disclosed. Thus, for example, in place of the plunger construction herein illustrated, a single unit plunger may be employed.

Likewise, other changes, additions, and substitutions may be made as hereinabove suggested. Reference will therefore be had to the appended claims for a definition of the limits of the invention.

What is claimed is:

1. In an oil pressure operating system for a valve, a plunger pump, an open ended cylinder having a valve actuating piston therein, a conduit connecting the pump and mechanism, means for periodically establishing communication between said cylinder and the atmosphere comprising a passage from the top of said cylinder and terminating in an outlet within the cylinder at the open end thereof and arranged in the plane of said valve, said piston being arranged to uncover said outlet at substantially the end of its inward stroke.

2. In a hydraulic valve operating system, a plunger pump, a valve, a valve operating mechanism including an open ended cylinder and a piston for opening the valve, spring means for closing the valve, means for replenishing the liquid supply of the system at each stroke of the pump, means for venting the cylinder by movement of the valve operating piston including a passageway connecting the top of said cylinder with the open end thereof at a point traversed by said piston, and the bottom end of said passageway being so located with reference to the piston as to be uncovered thereby at substantially the end of its inward movement.

3. In a hydraulic valve operating system, a plunger pump, a valve, a valve operating mechanism including an open ended cylinder and a piston for opening the valve, spring means for closing the valve, means for replenishing the liquid supply of the system at each stroke of the pump including an inwardly opening check valve in the pump plunger, said cylinder having a passageway therein connecting the top of said cylinder with the open end thereof at a point traversed by said piston, the bottom end of said passageway being so located with reference to the piston as to be uncovered thereby at substantially the end of its inward movement, and a check valve in said passageway arranged to open at a predetermined pressure in the cylinder.

4. In a hydraulic valve operating system, means for periodically raising and lowering the pressure in the system, a spring loaded valve, a valve operating mechanism including a cylinder having an open end and a piston for opening the valve, and means for venting the system to atmosphere including a passageway terminating in the open end of the cylinder and uncovered by the valve actuating piston only at the piston position corresponding to the low pressure portion of the system cycle.

RAYMOND P. LANSING.